(12) United States Patent
Wang et al.

(10) Patent No.: US 10,147,953 B2
(45) Date of Patent: Dec. 4, 2018

(54) LEAD-ACID BATTERY POSITIVE PLATE AND ALLOY THEREFORE

(71) Applicant: EXIDE TECHNOLOGIES, Milton, GA (US)

(72) Inventors: Xiangjun Wang, Woodstock, GA (US); David Robert Mihara, Cumming, GA (US); Prosper Adanuvor, Alpharetta, GA (US); Edward Mattan, Greenwood, AR (US)

(73) Assignee: EXIDE TECHNOLOGIES, Milton, GA (US)

( * ) Notice: Subject to any disclaimer, the term of this patent is extended or adjusted under 35 U.S.C. 154(b) by 0 days.

(21) Appl. No.: 14/431,500

(22) PCT Filed: Sep. 26, 2013

(86) PCT No.: PCT/US2013/061826
§ 371 (c)(1),
(2) Date: Mar. 26, 2015

(87) PCT Pub. No.: WO2014/052528
PCT Pub. Date: Apr. 3, 2014

(65) Prior Publication Data
US 2015/0243998 A1    Aug. 27, 2015

Related U.S. Application Data

(60) Provisional application No. 61/706,846, filed on Sep. 28, 2012.

(51) Int. Cl.
*H01M 4/68*     (2006.01)
*C22C 11/06*    (2006.01)
(Continued)

(52) U.S. Cl.
CPC ............. *H01M 4/685* (2013.01); *C22C 11/06* (2013.01); *H01M 4/14* (2013.01); *H01M 4/73* (2013.01); *H01M 10/06* (2013.01)

(58) Field of Classification Search
CPC ................................ H01M 4/68; H01M 4/685
See application file for complete search history.

(56) References Cited

U.S. PATENT DOCUMENTS

| 2004/0033157 | A1  | 2/2004 | Schaeffer |
| 2004/0142243 | A1* | 7/2004 | Furukawa ............... C22C 11/06 429/245 |

(Continued)

FOREIGN PATENT DOCUMENTS

| JP | S63152871 | 6/1988 |
| JP | H01117272 | 5/1989 |
| JP | H0765822  | 3/1995 |

OTHER PUBLICATIONS

International Application No. PCT/US2013/061826 International Search Report and Written Opinion dated Jan. 21, 2014, 9 pages.

(Continued)

*Primary Examiner* — Olatunji A Godo
(74) *Attorney, Agent, or Firm* — Cantor Colburn LLP (57) ABSTRACT

A lead-acid battery grid made from a lead-based alloy containing tin, calcium, bismuth and copper and characterized by enhanced mechanical properties, corrosion resistance, less battery gassing, lower sulfation and water loss, and no post-casting treatment requirements for age hardening. In one embodiment, the battery grids are formed from a lead-based alloy including about 2.0% tin, about 0.0125% copper, about 0.065% calcium, and about 0.032% bismuth. Preferably, the battery grid is free of silver beyond trace levels in the alloy.

13 Claims, 7 Drawing Sheets

(51) Int. Cl.
   *H01M 4/14*    (2006.01)
   *H01M 4/73*    (2006.01)
   *H01M 10/06*   (2006.01)

(56) References Cited

U.S. PATENT DOCUMENTS

| | | |
|---|---|---|
| 2004/0187986 A1* | 9/2004 | Schaeffer ................ C22C 11/06 |
| | | 148/706 |
| 2010/0101078 A1 | 4/2010 | Troxel et al. |
| 2011/0020693 A1 | 1/2011 | Hoshiba |
| 2012/0077095 A1 | 3/2012 | Roumi et al. |
| 2012/0121975 A1 | 5/2012 | Rajaram et al. |

OTHER PUBLICATIONS

EP Application No. 13841239.0 Extended Euopean Search Report dated Jan. 7, 2016, 6 pages.
AU Application No. 2013323563 Office Action dated Apr. 28, 2017, 3 pages.
EP Application No. 13841239 Office Action dated Jul. 5, 2017, 2 pages.
JP Patent Application No. 2015-534638 Office Action dated Jun. 20, 2017, 4 pages.
JP Patent Application No. 2015-534638 Notification of Reasons for Refusal dated Dec. 26, 2017, 3 pages.

* cited by examiner

LEAD-ACID BATTERY POSITIVE PLATE AND ALLOY THEREFORE

FIELD

The present disclosure relates to lead-acid batteries, and more particularly, to alloys for battery grids.

BACKGROUND

Lead-acid batteries are standard on most types of transportation vehicles including microhybrid vehicles. For example, lead-acid batteries are used to start the internal combustion engines of automobiles, trucks, and other equipment and to supply electricity for vehicle accessories. These battery requirements are known in the industry as SLI (Starting, Lighting and Ignition). Lead-acid batteries are also used in industrial stationary applications including emergency lighting and power supply systems with battery backup such as data networks, high-speed data transmission networks, wireless communication and cable TV systems.

There are two basic types of lead-acid battery designs: conventional flooded lead-acid and sealed Valve Regulated Lead-Acid (VRLA). VRLA batteries are sometimes referred to as an absorbed glass mat (AGM) battery. The performance requirements for these two types of lead-acid batteries vary significantly. It is well known that lead-acid batteries enjoy the best price/performance ratio for all energy storage devices available today.

Stationary applications are generally float applications, i.e., the cells are generally on float (i.e., an external voltage supply connected to the cells is held slightly above the cell potential to maintain charge), with an occasional need for a deep discharge when the main power source fails or is otherwise interrupted.

Other applications require repetitive deep discharges, down to a 80% depth of discharge or even somewhat greater. Suitable cells must thus be capable of enduring repetitive charge-deep discharge-charge cycling regimes for up to 500 cycles or even more. Indeed, it would be desirable to provide cells capable of enduring from 1,000 to 2,000 cycles or so.

Developing grid alloys that adequately satisfy the diverse requirements is difficult because stringent criteria must be satisfied regardless of the type of application. Suitable alloys must be capable of being cast into satisfactory grids and must impart adequate mechanical properties to the grid. Also, the alloys must impart satisfactory electrical performance to the cell in the intended application. Satisfactory alloys thus must impart the desired corrosion resistance, not result in thermal runaway (i.e., must not raise the tendency for the cell to lose water via gassing) and avoid premature capacity loss (sometimes referred to as "PCL").

More particularly, suitable alloys must be capable of being cast into grids by the desired technique, i.e., the cast grids must be low in defects as is known (e.g., relative freedom from voids, tears, microcracks and the like). Such casting techniques range from conventional gravity casting ("book molds" or the like) to continuous processes using expanded metal techniques. Alternatively, grids may be punched.

The resulting grids need to be strong enough to endure processing into plates and assembly into cells in conventionally used equipment. Even further, suitable grids must maintain satisfactory mechanical properties throughout the expected service life. Any substantial loss in the desired mechanical properties during service life can adversely impact upon the cell performance as will be more fully discussed hereinafter.

Considering now the electrochemical performance required, the grid alloy for positive plates must yield a cell having adequate corrosion resistance. Yet, the use of a continuous direct casting process, for example, which may be desirable from the standpoint of economics, ostensibly can compromise corrosion resistance. Such continuous processes thus orient the grains in the grids, thereby making the intergranular path shorter and more susceptible to corrosion attack and to early failures.

Positive grid corrosion thus is a primary mode of failure of VRLA lead-acid cells. When positive grid corrosion occurs, this lowers the electrical conductivity of the cell itself. Cell failure occurs when the corrosion-induced decrease in the conductivity of the grid causes the discharge voltage to drop below a value acceptable for a particular application.

A second failure mechanism, also associated with grid corrosion, involves failure due to "grid growth." During the service life of a lead-acid cell, the positive grid corrodes; and the corrosion products form on the surface of the grid. In most cases, the corrosion products form at the grain boundaries and grid surface of the lead-acid where the corrosion process has penetrated the interior of the "wires" of the grid. These corrosion products are generally much harder than the lead alloy forming the grid and are less dense. Due to the stresses created by these conditions, the grid alloy moves or grows to accommodate the bulky corrosion products. This physical displacement of the grid causes an increase in the length and/or width of the grid. The increase in size of the grid may be nonuniform. A corrosion-induced change in the dimension of the grid may also sometimes be called "creep".

When grid growth occurs, the movement and expansion of the grid begins to break the electrical contact between the positive active material and the grid itself. This movement and expansion prevents the passage of electricity from some reaction sites to the grid and thereby lowers the electrical discharge capacity of the cell. As this grid growth continues, more of the positive active material becomes electrically isolated from the grid and the discharge capacity of the cell decays below that required for the particular application. The mechanical properties of the alloy thus are important to avoid undue creep during service life.

Still further, and importantly, the use of the alloys must not result in thermal runaway. VRLA cells must avoid conditions in service in which the temperature within the cell increases uncontrollably and irreversibly. It has been hypothesized that excessive water loss resulting in cell dry-out is the driving mechanism for thermal runaway in VRLA cells. This water loss can be caused by hydrogen gassing at the negative electrode or oxygen gassing at the positive electrode through the electrolysis of water, or both.

As the water content and thus the cell saturation is reduced, the oxygen recombination efficiency is increased. Since this recombination reaction is highly exothermic, this tends to heat the cell. As the temperature rises, the cell tends to generate gas; and the recombination processes become even more efficient, thereby further increasing the cell temperature. In similar fashion, water loss increases the cell electrical resistance; and such increased cell resistance increases the cell temperature, thereby further increasing water loss. The cell is in thermal runaway.

Accordingly, to avoid alloys that will push cells into thermal runaway, the effect of the alloy and its constituents on gassing at both electrodes must be taken into consideration. As is well known, antimonial alloys have been considered necessary for positive grids where the cells are required in service to endure deep discharge-charge cycling regimes. Yet, in general, although not exclusively, antimonial alloys cause thermal runaway in VRLA cells due to excessive gassing at both electrodes. Antimony thus leaches out from the positive grid as corrosion takes place, dissolving into the electrolyte, ultimately migrating to and "electroplating" onto the negative electrode. These antimony sites on the negative electrode thus become preferential to hydrogen gassing. Additionally, the presence of antimony on the negative electrode increases the self-discharge and thereby heats the cell since the self-discharge current is also reflected in the float current.

Poisoning of the positive electrode, of course, also must be avoided. Undue gassing at the positive electrode can thus lead to thermal runaway.

Further, the alloys must maintain adequate contact for electrical conductance throughout the desired service life. Otherwise, the cell will experience what has been termed as "premature capacity loss" ("PCL"). PCL can also occur through loss of contact due to cracking of the corrosion layer or from a nonconductive film generated in the corrosion layer. Because of the complexity and the substantial potential adverse effects, this is a difficult criteria to achieve in combination with the other necessary criteria.

It would also be desirable to provide positive grid alloys capable of enduring deep discharge-charge cycling regimes. Satisfying these criteria would also allow use of such alloys for both motive power and stationary VRLA applications.

Lead sulfate ($PbSO_4$) crystals on the plates are formed as batteries discharge. These crystals become relatively difficult to charge if the plates are left in the discharged state or at open circuit for a significant period of time. Moreover, the fluid in a battery tends to evaporate over time to such an extent that upper edges of battery plates become exposed that they become susceptible to corrosion. This corrosion of the plates, especially positive plates, further deteriorates the ability of a battery to be recharged and hold a charge.

In some prior batteries and, in particular, industrial batteries, MFX (PbSbCd) is the main alloy for the positive grids. MFX is robust and has good mechanical properties and excellent corrosion resistance. However, this alloy contains Cd, which causes environmental and recycling issues. Therefore, the use of Cd-containing alloys is restricted globally because of environmental concerns.

Alloy A (PbSnCaAg) is a replacement for MFX and is used extensively in current production. It performs well in the BCI cycle life test, but overall it does not fully match the performance of MFX. The addition of Ag increases the general corrosion resistance but also increases cost and creates adhesion issues between the grids and PAM (Positive Active Materials). In particular, it shows PCL at the high rate discharge test.

What is needed in the art is a new alloy for a battery grid that adequately satisfies the diverse requirements needed for making battery grids for positive plates and, in particular, is cheaper and performs better than current Alloy A.

SUMMARY

The problems and disadvantages of the prior art are overcome or alleviated by the present lead-acid battery that applies battery design features that protects the battery from permanent deep discharge damage and promotes charge acceptance during float applications. In exemplary embodiments, a unique combination of battery materials that are applied in unique proportions have been found by experimentation to enable the battery to better hold a charge during float operations. The proportions and ratio at which these exemplary materials are applied are unique.

Exemplary embodiments of the invention also use certain materials and/or material characteristics that are unique either in their use or in their amount. By maintaining a unique ratio of materials related to the positive grid metal alloy, a battery of the present invention exhibits superior performance for long periods of time. The optimal materials and their proportions and ratios of use are disclosed in detail in the body of this specification. These unique exemplary materials used in unique proportions and percentages, in combination with conventional materials, have by experimentation been found to provide cumulatively an advantageous lead-acid battery that overcomes problems that have plagued lead-acid batteries in the past. Exemplary embodiments of the positive grid metal alloy of this invention overcome such problems with excellent mechanical properties, enhanced corrosion resistance, less gassing and therefore lower rate of sulfation and water loss, and no post-casting treatments required to age-harden battery grids.

Moreover, presently described new, exemplary lead based alloys containing tin, calcium, bismuth and copper may be characterized by enhanced mechanical properties, corrosion resistance, less battery gassing, lower sulfation and water loss, and no post-casting treatment requirements for age hardening so that the grids can be processed much sooner after being cast or punched.

One embodiment of the present invention includes a lead-acid cell having a positive plate and a negative plate disposed with a container, a separator disposed within said container and separating said positive and negative plates, and an electrolyte within said container, said positive plate comprising a grid supporting structure having a layer of active material thereon, said grid supporting structure comprising a lead-based alloy consisting essentially of lead, from about 1.5% to about 3.0% tin, from about 0% to about 0.02% copper, from about 0.015% to about 0.04% bismuth, from about 0% to about 0.02% barium, and from about 0% to about 0.08% calcium, the percentages being based upon the total weight of said lead-based alloy.

Both the foregoing general description and the following detailed description provide examples and are explanatory only. Accordingly, the foregoing general description and the following detailed description should not be considered to be restrictive. Further, features or variations may be provided in addition to those set forth herein. For example, embodiments may be directed to various feature combinations and sub-combinations described in the detailed description.

The above-discussed and other features and advantages of the present invention will be appreciated and understood by those skilled in the art from the following detailed description and drawings.

BRIEF DESCRIPTION OF THE DRAWINGS

Referring to the FIGURES wherein like elements are numbered alike in the several FIGURES.

DESCRIPTION OF EXEMPLARY EMBODIMENTS

As required, exemplary embodiments of the present invention are disclosed. The various embodiments are meant to be non-limiting examples of various ways of implementing the invention and it will be understood that the invention may be embodied in alternative forms. The present invention will be described more fully hereinafter with reference to the accompanying drawings in which like numerals represent like elements throughout the several figures, and in which exemplary embodiments are shown. The figures are not necessarily to scale and some features may be exaggerated or minimized to show details of particular elements, while related elements may have been eliminated to prevent obscuring novel aspects. The specific structural and functional details disclosed herein should not be interpreted as limiting, but merely as a basis for the claims and as a representative basis for teaching one skilled in the art to variously employ the present invention.

Figures 1, 2:
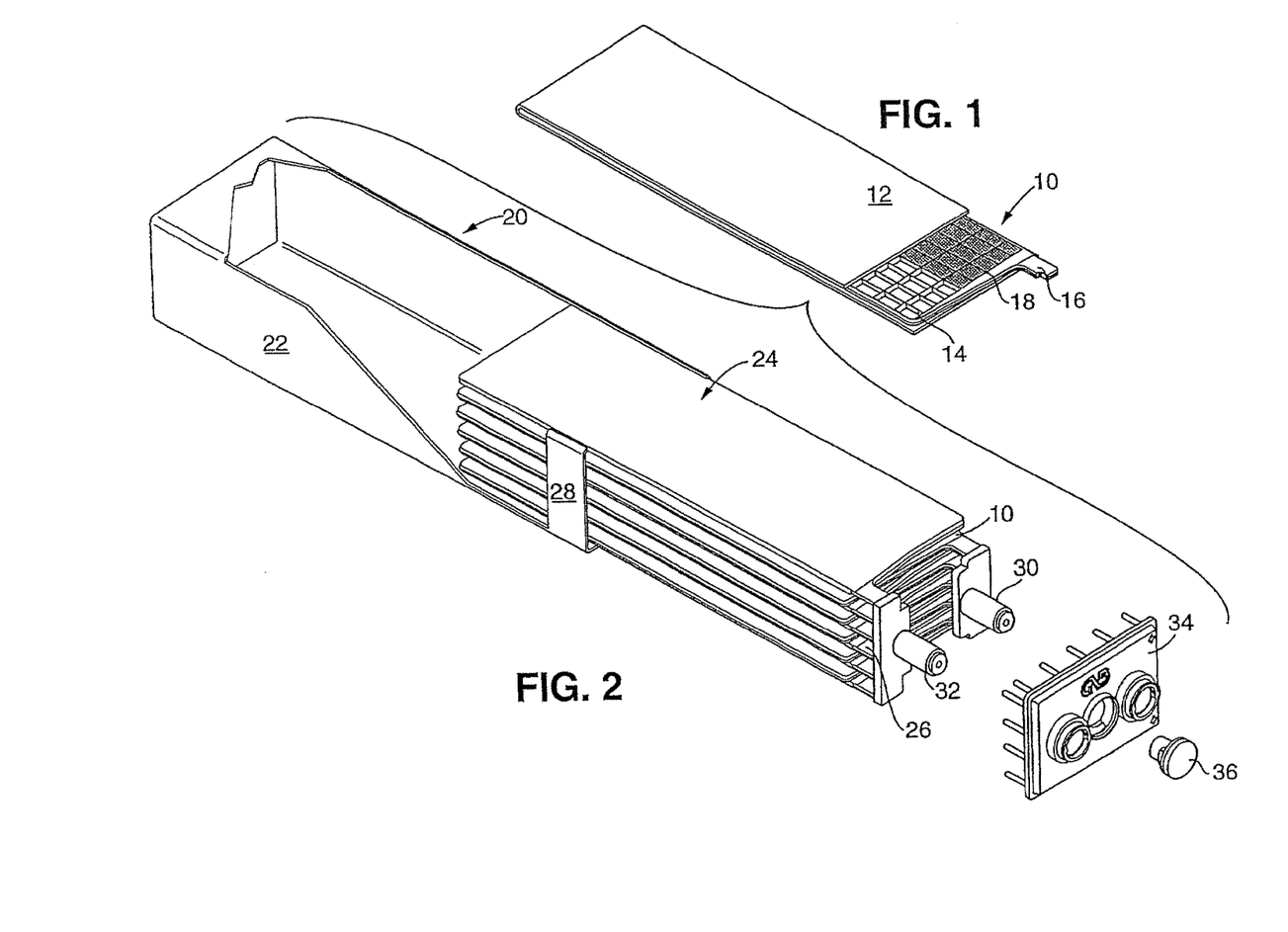
FIG. 1 illustrates an exemplary lead-acid battery.
FIG. 2 illustrates an exemplary VRLA cell.

Although an industrial VRLA battery is shown in FIGS. 1 and 2, the various embodiments of the present invention may include any type of lead acid battery including, for example, transportation batteries. FIG. 1 illustrates an exemplary lead-acid battery having a positive plate, indicated generally at 10, with a separator 12 enveloping the positive plate 10. The positive plate 10 generally comprises a grid 14 having a plate lug 16 and positive active material 18 pasted onto grid 14. As is known, there are many different configurations for the grid. Additionally, in VRLA cells, the separator is typically an absorbent glass fiber mat. Other commercially available glass fiber separators incorporate polyolefin or other polymeric fibers to replace part of the glass fibers.

FIG. 2 illustrates a VRLA cell, indicated generally at 20. The cell 20 thus includes a container or jar 22 retaining snugly therein an element stack, shown generally at 24. The element stack 24 thus comprises a series of positive plates 10 and negative plates 26 alternately disposed and having separators 12 separating adjacent positive and negative plates. Band 28 is used to hold adjacent plates in the desired compression and to facilitate assembly (the band encircling the element stack 24, but being partially broken away in FIG. 2 for illustrative purposes). The VRLA cell 20 likewise includes a positive terminal 30, a negative terminal 32, and a cover 34 affixed to container or jar 22 by any appropriate means, as is known. Inasmuch as VRLA cells function by oxygen recombination, as is known, a low pressure, self-resealing valve 36 is used to maintain the desired internal pressure within the cell. Many suitable relief valves are known and used.

The grid 14 includes a Pb—Sn—Ca type alloy with some other elements and characteristics as described hereinafter below. In one embodiment, Ca is fixed at about 0.065%, just below the peritectic composition, and preferably no Ag added.

A full factorial design of experiment (DOE) with four factors, Sn, Cu, Bi and Ba, generates the alloy matrix for lab testing. Tables 1 and 2 identify the factor levels and the alloy matrix. Alloy A is the control.

TABLE 1

Factors and levels

| Factor | Levels | | |
|---|---|---|---|
| Sn | 1.5% | 2.0% | 3.0% |
| Cu | 0.000% | 0.0125% | NA |
| Bi | 0.015% | 0.032% | |
| Ba | 0.000% | 0.0175% | |

TABLE 2

Alloy Matrix

| Alloy # | Sn % | Cu % | Bi % | Ba % |
|---|---|---|---|---|
| 1 | 1.5 | 0.0000 | 0.015 | 0.0000 |
| 2 | 1.5 | 0.0000 | 0.015 | 0.0175 |
| 3 | 1.5 | 0.0000 | 0.032 | 0.0000 |
| 4 | 1.5 | 0.0000 | 0.032 | 0.0175 |
| 5 | 1.5 | 0.0125 | 0.015 | 0.0000 |
| 6 | 1.5 | 0.0125 | 0.015 | 0.0175 |
| 7 | 1.5 | 0.0125 | 0.032 | 0.0000 |
| 8 | 1.5 | 0.0125 | 0.032 | 0.0175 |
| 9 | 2.0 | 0.0000 | 0.015 | 0.0000 |
| 10 | 2.0 | 0.0000 | 0.015 | 0.0175 |
| 11 | 2.0 | 0.0000 | 0.032 | 0.0000 |
| 12 | 2.0 | 0.0000 | 0.032 | 0.0175 |
| 13 | 2.0 | 0.0125 | 0.015 | 0.0000 |
| 14 | 2.0 | 0.0125 | 0.015 | 0.0175 |
| 15 | 2.0 | 0.0125 | 0.032 | 0.0000 |
| 16 | 2.0 | 0.0125 | 0.032 | 0.0175 |
| 17 | 3.0 | 0.0000 | 0.015 | 0.0000 |
| 18 | 3.0 | 0.0000 | 0.015 | 0.0175 |
| 19 | 3.0 | 0.0000 | 0.032 | 0.0000 |
| 20 | 3.0 | 0.0000 | 0.032 | 0.0175 |
| 21 | 3.0 | 0.0125 | 0.015 | 0.0000 |
| 22 | 3.0 | 0.0125 | 0.015 | 0.0175 |
| 23 | 3.0 | 0.0125 | 0.032 | 0.0000 |
| 24 | 3.0 | 0.0125 | 0.032 | 0.0175 |
| 25 | Alloy A | | | |
| 26 | Alloy B (pure lead) | | | |

"Dog bone" samples were gravity cast. Hardness and tensile tests were performed to evaluate the mechanical properties of the alloys as-cast and aged at the room temperature and heat treated at 100° C. for three hours.

The corrosion tests were performed at 60° C., in $H_2SO_4$ with 1.30 s.g., and with potential of about 1.30V vs. $Hg/Hg_2SO_4$ reference electrode. Four samples of each alloy were used for each test cell. The test time is from 1.5 to 11 months. After the corrosion test, the weight loss and sample dimension changes were measured and the corrosion layer was analyzed with a scanning electron microscope (SEM) and optical microscope.

Figure 3:
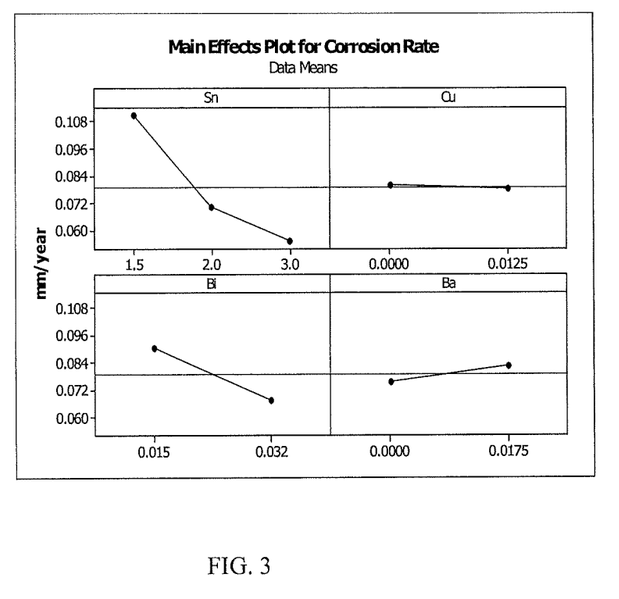
FIG. 3 illustrates main effect plots for corrosion rate from an 8-month test cell.
Figure 4:
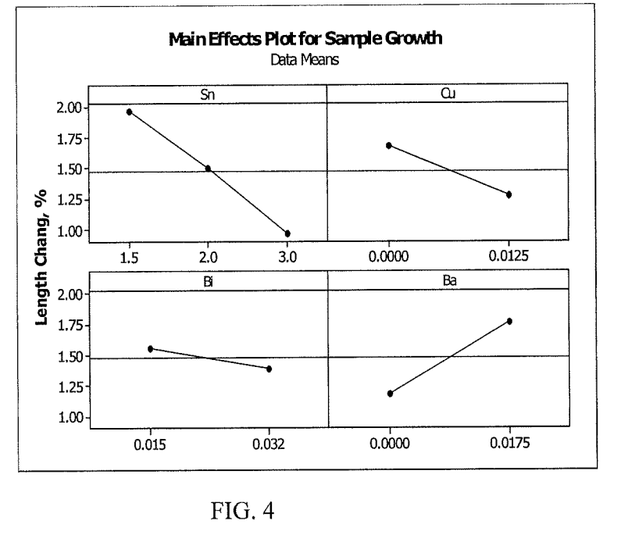
FIG. 4 illustrates main effect plots for sample length growth from an 8-month test cell.
Figure 5:
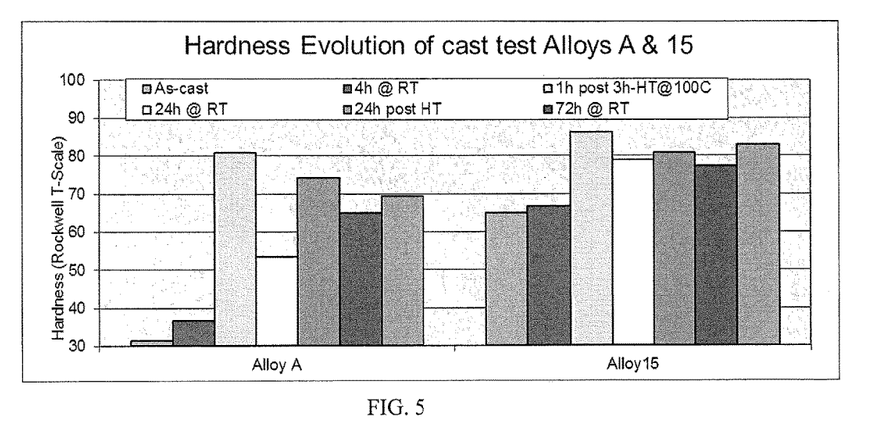
FIG. 5 illustrates a graph of hardness evolution for Alloy A and Alloy 15.
Figure 6:
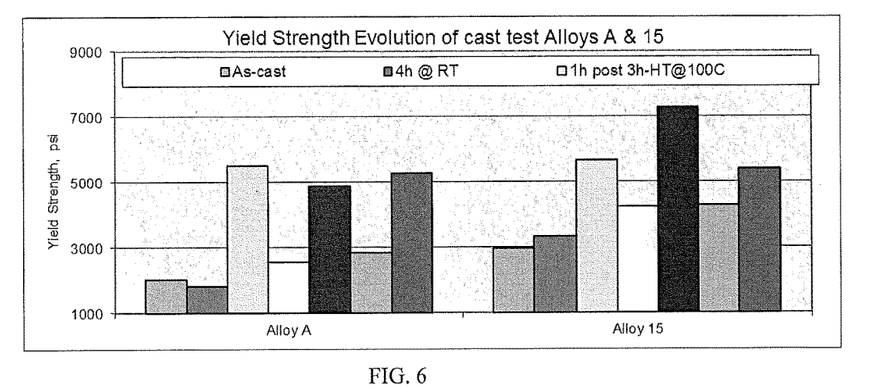
FIG. 6 illustrates a graph of yield strength evolution for Alloy A and Alloy 15.
Figure 7:
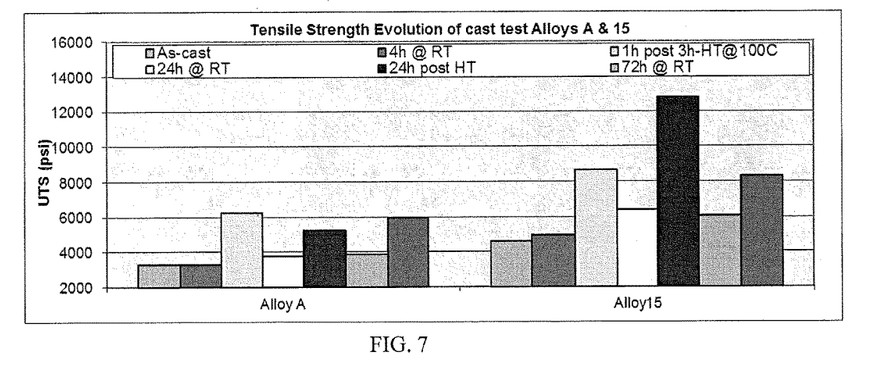
FIG. 7 illustrates a graph of tensile strength evolution for Alloy A and Alloy 15.

For the 1.5, 5 and 8-month corrosion test cells, the effect of variables were similar. FIGS. 3 and 4 illustrate the main effect plots for the corrosion rate and sample length growth from the 8-month test cell. Both Sn and Bi reduce the corrosion rate and sample growth. Cu almost has no effect on the corrosion rate but reduces the sample growth. Ba had a negative effect on the corrosion rate and sample growth.

The effect of Sn on the corrosion rate is more significant from 1.5 to 2.0% than from 2.0 to 3.0%. Therefore, the preferred alloy is with 2.0% Sn, 0.032% Bi and 0.0125% Cu (Alloy 15 in the matrix) and was selected for battery build tests.

Figure 8:
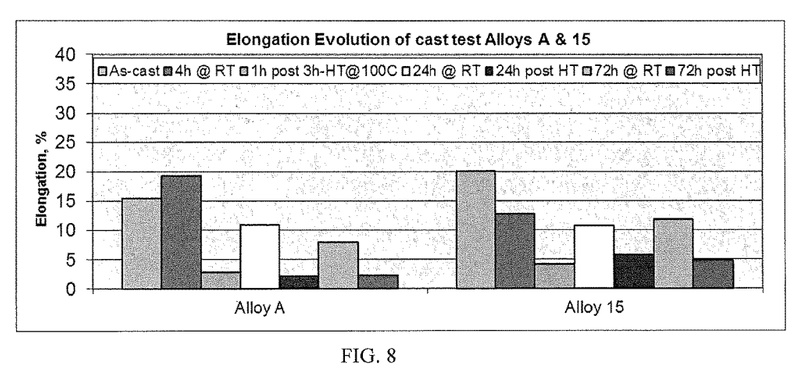
FIG. 8 illustrates a graph of elongation evolution for Alloy A and Alloy 15.

FIGS. 5-8 compare mechanical properties for Alloy A and Alloy 15. With higher Ca content, Alloy 15 has higher hardness (FIG. 5), yield (FIG. 6) and tensile (FIG. 7) strength with the similar elongation (FIG. 8).

Oxygen overvoltage measurements were carried out in 1.30 SG sulfuric acid at 25° C., 35° C., and 45° C., respectively, at electrodes fabricated from Alloys 15, A, and B (pure lead). The Tafel parameters derived from the Tafel equation $\eta$ (overvoltage)=a+b Log [i] are presented in Table 3, below, where a is the intercept and b is the slope. b represents the overvoltage per a decade increment in current density, and a is related to the exchange current density at the open circuit voltage by the relationship Log $[i_o]$=a/b. The Tafel slope, b, is the same for all the 3 test alloys. The Tafel slope is related to the reaction mechanism for oxygen evolution at the test electrode. What this means is that the mechanism for oxygen evolution appears to be independent of alloy type or the operating temperature.

Cell Test Results

Based on the above lab test results, Alloy 15 (Pb2.0Sn0.065Ca0.032Bi0.0125Cu) is selected for the battery test. Test results are illustrated in FIGS. 10-13.

Figure 10:
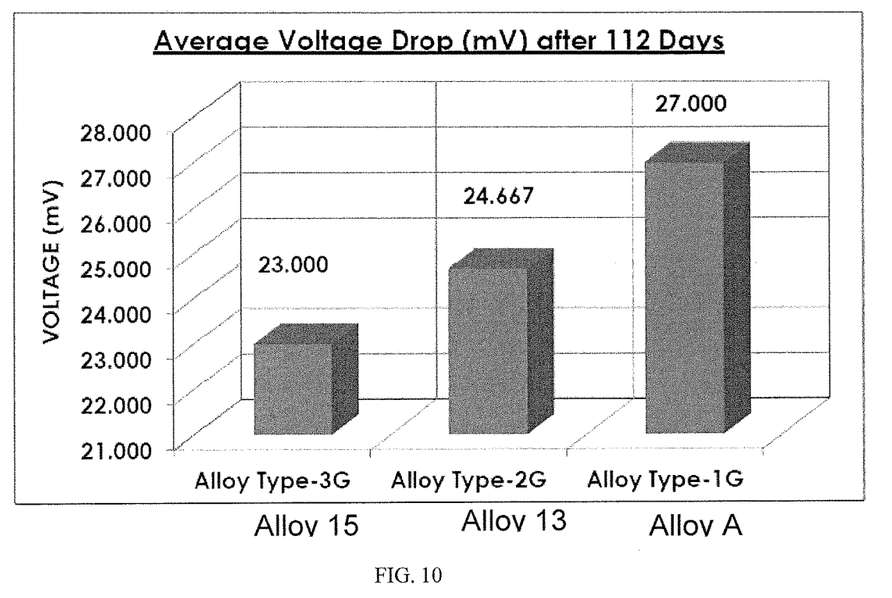
FIG. 10 illustrates a graph of stand loss, or average voltage drop (mV) after 112 days for Alloy 15, 13 and A.

FIG. 10 illustrates stand loss, or average voltage drop (mV) after 112 days for Alloy 15, 13 and A.

Figure 11:
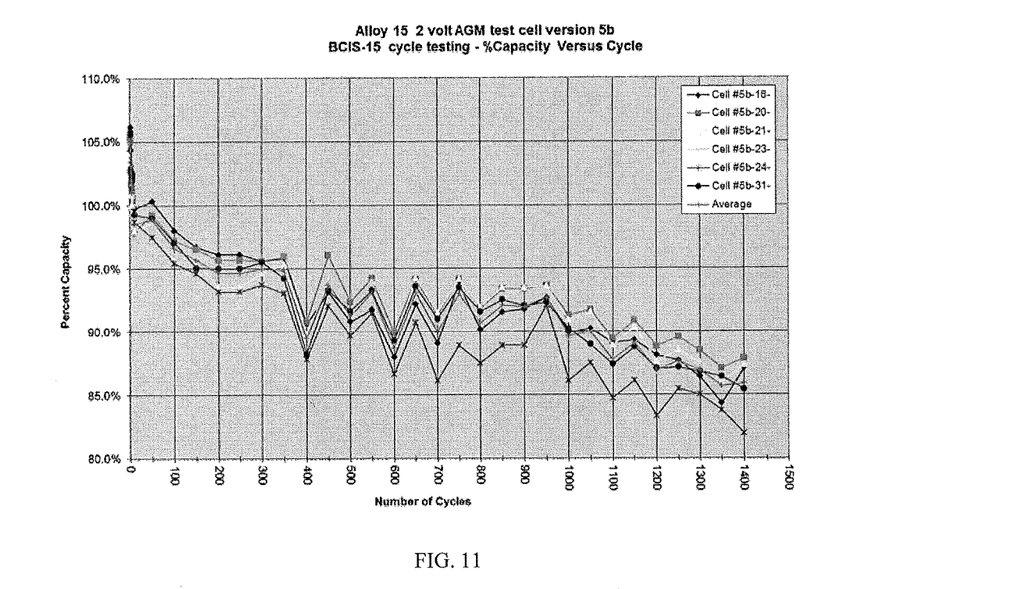
FIG. 11 illustrates a graph of BCI cycle life capacity discharge for Alloy 15 cells.

FIG. 11 illustrates BCI cycle life capacity discharge for Alloy 15 cells.

Figure 12:
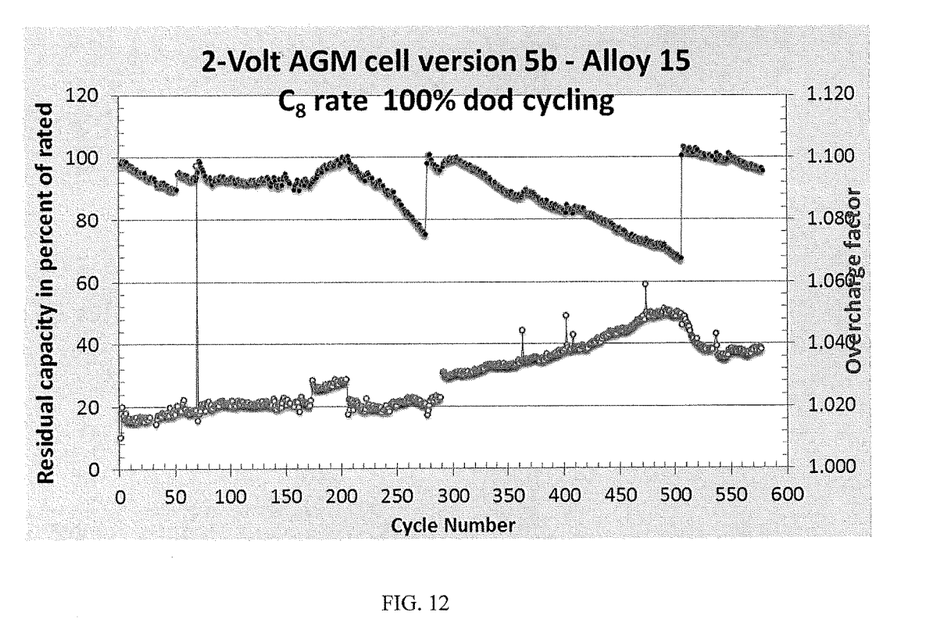
FIG. 12 illustrates a graph of low rate cycle life, C/8, 100% DoD cycle test (Alloy 15, residual capacity=95% after 580 cycles) for a 2-Volt AGM cell version.

FIG. 12 illustrates low rate cycle life, C/8, 100% DoD cycle test (Alloy 15, residual capacity=95% after 580 cycles) for a 2-Volt AGM cell version.

Figure 13:
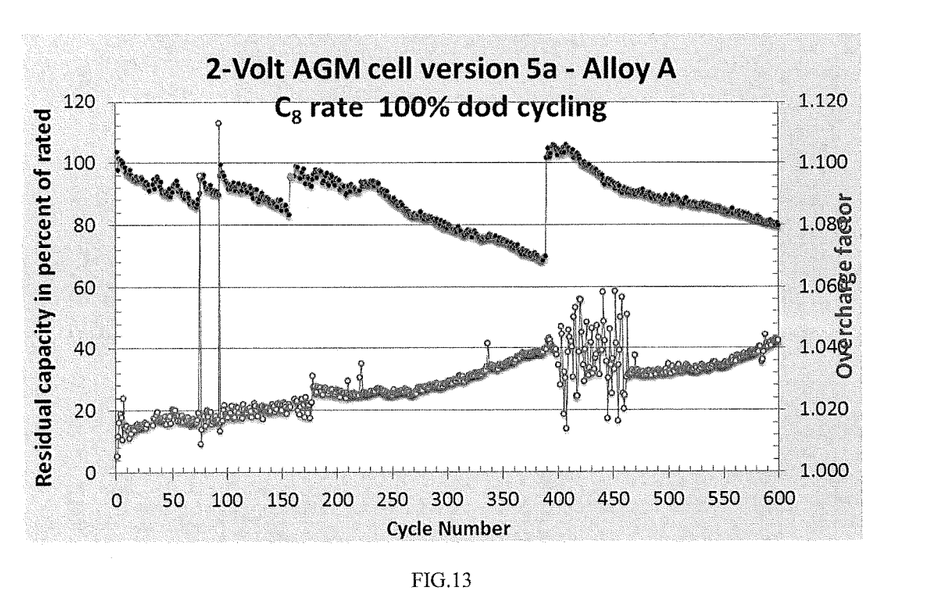
FIG. 13 illustrates a graph of low rate cycle life, C/8, 100% DoD cycle test (Alloy A, residual capacity=80% after 600 cycles) for another 2-Volt AGM cell version.

FIG. 13 illustrates low rate cycle life, C/8, 100% DoD cycle test (Alloy A, residual capacity=80% after 600 cycles) for another 2-Volt AGM cell version.

As can be seen, the up-to-date cell test results show that alloy 15 performs equally or better than Alloy A. Other alloys, including but not limited to, alloys 13, 14 and 16 may adequately satisfy the diverse requirements needed for making battery grids for positive plates. Moreover, these alloys are characterized by enhanced mechanical properties, corrosion resistance, less battery gassing and water loss, enhanced electrical performance, and no post-casting treatment requirements for age hardening so that the grids can be processed much sooner after being cast. These criteria should be satisfied regardless of the type of application.

It is important to note that the construction and arrangement of the elements of the alloy for a battery grid as shown in the preferred and other exemplary embodiments is illus-

TABLE 3

Tafel Parameters for Alloys 15, A, and B in 1.30 Acid

| | | Tafel Parameters | | $i_o$, mA/cm$^2$ | | |
| --- | --- | --- | --- | --- | --- | --- |
| Sample ID | Alloy Composition | b (mV) | Ea (kJ/mole) | (25° C.) ×10$^{-6}$ | (35° C.) ×10$^{-6}$ | (45° C.) ×10$^{-6}$ |
| Alloy 15 | Pb—0.065Ca—2.0Sn0.012Cu—0.032Bi | 110 ± 0.2 | 56.9 ± 3.9 | 0.9 | 1.1 | 1.6 |
| Alloy A | Pb—0.04Ca—0.025Ag—2.0Sn | 111 ± 0.2 | 36.6 ± 4.2 | 2.0 | 2.4 | 4.1 |
| Alloy B | Primary pure Pb | 110 ± 0.1 | 52.5 ± 3.7 | 1.0 | 1.7 | 2.7 |

The exchange current density, io, describes the rate of reaction (for $O_2$ evolution) under open circuit conditions. The higher the value, the greater is the rate of $O_2$ evolution at that electrode. A higher exchange current density would signify a catalytic effect of the alloy on oxygen evolution. The exchange current density for alloy 15 is appreciably lower than that for Alloy A. In fact, it is comparable to that of Alloy B (pure Pb). Furthermore, the activation energy for oxygen evolution on alloy 15 (similar to that of Alloy B) is significantly higher than that of Alloy A.

Figure 9:
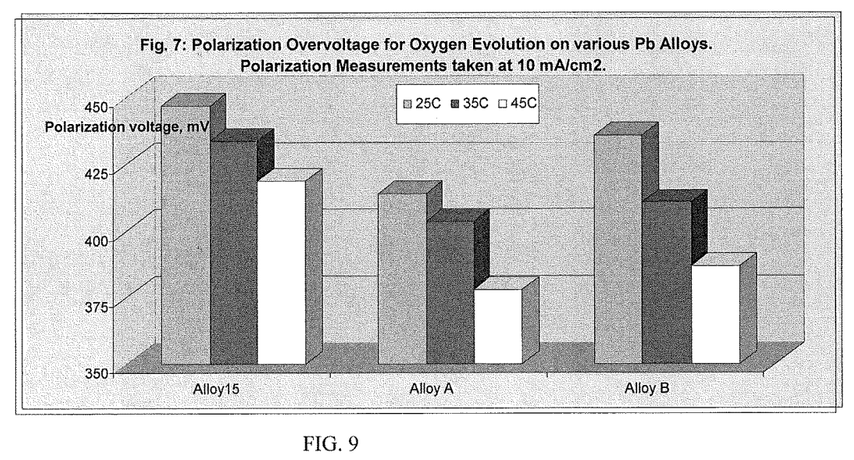
FIG. 9 illustrates a graph of polarization overvoltage for oxygen evolution on Alloys 15, A and B.

A plot of the polarization voltage at a specific current density of 10 mA/cm2 in FIG. 9 confirms a much higher polarization resistance for Oxygen evolution on Alloy 15 than on Alloy A. Consequently, the rate of oxygen evolution on Alloy 15 would be expected to be relatively lower than that on Alloy A but comparable to that of Alloy B (pure Pb). The lower gassing rate could lead to lower self-discharge rates in the battery and to a more efficient recombination process in VRLA systems.

Bismuth in combination with copper and tin in the alloy raises the oxygen overvoltage. Alloying additives that raise the oxygen overvoltage have the propensity to mitigate the impact of gassing at the positive plate. Alloy 15 is comparable to Alloy B (pure lead) in terms of resistance to gassing at the positive plate.

trative only. Although only a few embodiments of the present inventions have been described in detail in this disclosure, those skilled in the art who review this disclosure will readily appreciate that many modifications are possible (e.g. variations in combinations and subcombinations of the amounts of the alloy elements) without materially departing from the novel teachings and advantages of the subject matter recited in the claims. For example, elements may be substituted and added, and the amounts of the elements may vary. Accordingly, all such modifications are intended to be included within the scope of the present invention as defined in the appended claims. The order or sequence of any process or method steps may be varied or re-sequenced according to alternative embodiments. Other substitutions, modifications, changes and omissions may be made in the design, operating conditions and arrangement of the preferred and other exemplary embodiments without departing from the spirit of the present inventions as expressed in the appended claims.

What is claimed is:

1. A lead-acid cell having a positive plate and a negative plate disposed with a container, a separator disposed within said container and separating said positive and negative plates, and an electrolyte within said container, said positive plate comprising a grid supporting structure having a layer of active material thereon, said grid supporting structure comprising a lead-based alloy consisting essentially of lead, from about 1.5% to about 3.0% tin, from about 0.01% to about 0.02% copper, from about 0.015% to about 0.04% bismuth, and from 0% to about 0.08% calcium, the percentages being based upon the total weight of said lead-based alloy.

2. The lead-acid cell of claim 1 wherein the tin content of said alloy is about 1.75% to about 2.25%.

3. The lead-acid cell of claim 1 wherein the tin content of said alloy is about 1.95% to about 2.05%.

4. The lead-acid cell of claim 1 wherein the tin content of said alloy is about 2.0%.

5. The lead-acid cell of claim 1 wherein the copper content of said alloy is about 0.0125%.

6. The lead-acid cell of claim 1 wherein the bismuth content of said alloy is about 0.015% to about 0.035%.

7. The lead-acid cell of claim 1 wherein the bismuth content of said alloy is about 0.032%.

8. The lead-acid cell of claim 1 wherein said alloy is free of barium beyond trace levels in the alloy.

9. The lead-acid cell of claim 1 wherein the calcium content of said alloy is about 0.05% to about 0.07%.

10. The lead-acid cell of claim 1 wherein the calcium content of said alloy is about 0.065%.

11. The lead-acid cell of claim 1 wherein said alloy is free of silver beyond trace levels in the alloy.

12. The lead-acid cell of claim 1 wherein said grid is a cast grid.

13. The lead-acid cell of claim 1 wherein the battery is sealed.

* * * * *